Sept. 24, 1929.    F. E. LEE    1,729,484
FLOAT VALVE
Filed Aug. 22, 1927
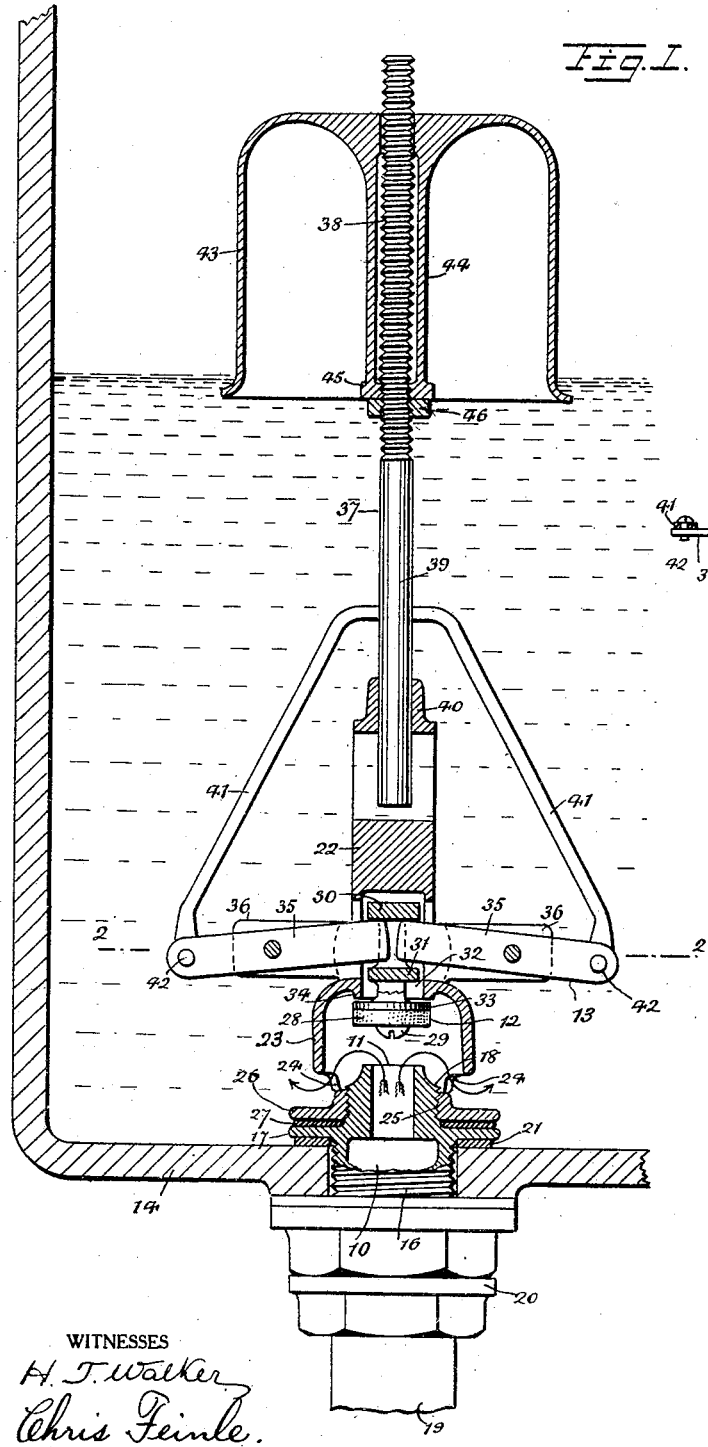
WITNESSES
H. T. Walker
Chris Feinle.
INVENTOR
Francis E. Lee
BY
ATTORNEYS Patented Sept. 24, 1929

1,729,484

UNITED STATES PATENT OFFICE

FRANCIS EDWARD LEE, OF JERSEY CITY, NEW JERSEY, ASSIGNOR OF ONE-HALF TO WILLIAM F. BAILEY, OF JERSEY CITY, NEW JERSEY

FLOAT VALVE

Application filed August 22, 1927. Serial No. 214,636.

This invention relates to float valves such as are used in conjunction with a water flush tank for controlling the filling of the tank.

The principal object of the present invention is to provide improvements in a float valve which renders it more reliable in operation, one that is not easily liable to get out of order, one which is simple of construction, and one which is comparatively inexpensive.

The nature of the invention and its distinguishing features and advantages will appear when the following specification is read in connection with the accompanying drawing, in which—

Figure 1 is a sectional elevation of the float valve embodying the present invention employed in conjunction with a water flush tank, a portion of which is shown, and the valve being about to operate to move the valve member thereof to a closed position.

Fig. 2 is a sectional view taken on the line 2—2 of Fig. 1.

The float valve of the present invention, generally stated, comprises an inlet 10, valve means for controlling the flow of water which consists of a seat 11 and a valve member 12; and means 13 for effecting the movement of the valve member 12 into and out of engagement with the seat 11 by virtue of the action of water in a tank 14, a portion of which is shown, and trapped air.

The inlet 10 is in the form of a fitting which may be of any standard size consisting of a tubular body threaded as at 16, having a flange 17, and a threaded neck 18. The inlet 10 extends through the bottom of the tank 14 and is connected with a water supply pipe 19 by means of a suitable coupling or union 20 engageable with the threads 16. The flange 17 has arranged beneath the same a suitable gasket 21 to produce a water-tight joint.

The seat 11 forming a part of the valve means for controlling the flow of water through the inlet 10, in the present instance, is formed on the neck 18. A valve member and float stem guide 22 is employed. One end of the guide has formed on the lower end thereof a hollow member 23 having passages 24, a threaded bore 25 and a flange 26. The threaded bore is adapted for threading engagement with the threaded neck 18 to effect connection of the guide 22 with the inlet 10. The flange 26 will be disposed over the flange 17 and a suitable gasket 27 is arranged between the said flanges to effect a tight joint at this point.

The valve member 12 forming a part of the valve means for controlling the flow of water has a gasket 28 which is detachably held in place by a screw 29. The gasket 28 is arranged on the lower end of the valve member 12. The upper end of the valve member 12 is formed to provide spaced portions 30 and 31. The valve member is guided for up and down movement in a bore 32. The gasket 28 of the valve member 12 is movable into and out of engagement with the seat 11. The valve member 12 is limited in its upward movement by the engagement of the shoulder 33 on the valve member with the shoulder 34 on the hollow member 23.

The means for effecting the up and down movement of the valve member 12, includes two levers 35 arranged diametrically opposite each other, and which are operatively carried by radial members 36 on the guide 22. The said means for operating the valve member 12 also includes a stem 37 having a threaded portion 38 and a plain portion 39. The plan portion 39 of the stem extends through a bearing 40 on the upper end of the guide, and has sliding movement with respect to said bearing 40. The portion 39 of the stem is connected with the levers 35 by members 41. Each member 41 has pivotal connection as at 42 with its related lever 35. The said means for operating the valve member 12 also includes a float 43 which is in the form of a hollow element or bell open at the lower end and having a central tubular member 44. The lower end of the tubular member 44 has a nut 45 adapted for threading engagement with the threaded portion 38 of the stem by virtue of which the float 43 may be adjusted on the stem to any desired position. A locking nut 46 coacts with the nut 45 to hold the float in the desired adjusted position. The opposed ends of the levers 35 coact with the portions 30 and 31 of the valve member 12 in effecting the movement of the valve member up and down.

When the tank 14 is empty, the float 43 will drop to a position causing the actuation of the levers 35 by virtue of the intervention of the stem 37 and members 41 connected respectively with the levers 35 causing the latter to coact with the portion 30 to elevate the valve member to an open position. Water will then flow through the inlet 10, out through the passages 24, into the tank 14. When the water in the tank 10 rises to a predetermined level, a certain amount of air will be trapped in the float 43, and by virtue of the action of the water which continues to rise, and the air trapped in the float 43 by water rising into the float, the float will move upwardly. Consequently, the valve member 12 will be moved downwardly by virtue of the intervention of the stem 37 and levers 35 which bear on the portion 31 of the valve member 12 causing the gasket 28 of the valve member to move into engagement with the seat 11 thereby shutting off the flow of water through the inlet 10. These operations are repeated as the tank 14 is emptied for the usual purposes.

It is to be understood that the invention is not restricted to the precise arrangement of parts shown and described, as details of construction may be modified and rearranged without departing from the spirit of the invention, the scope of which is limited only by the terms of the appended claim.

I claim:

A float valve comprising a hollow body having a guide rigid therewith, an inlet and an outlet; a valve member, a stem guided for up and down movement in said guide, levers on said body acting on said valve member to move the latter up and down to open and close the inlet, said levers being connected with said stem by rigid members rigidly connected with the stem and pivotally connected respectively with the levers to operate the levers in response to the up and down movement of the stem, and a float element connected with the stem to move the stem up and down.

FRANCIS EDWARD LEE.